United States Patent [19]

Hagiwara

[11] Patent Number: 5,145,470
[45] Date of Patent: Sep. 8, 1992

[54] POWER DELIVERING APPARATUS

[75] Inventor: Makoto Hagiwara, Utsunomiya, Japan

[73] Assignee: Viscodrive Japan Kabushiki Kaisha, Tokyo, Japan

[21] Appl. No.: 648,300

[22] Filed: Jan. 31, 1991

[30] Foreign Application Priority Data

Feb. 8, 1990 [JP] Japan ............... 2-011049[U]

[51] Int. Cl.⁵ .............................. F16H 1/44
[52] U.S. Cl. ....................... 475/230; 475/231; 475/246; 475/85
[58] Field of Search ............ 475/85, 200, 230, 231, 475/246, 247

[56] References Cited

U.S. PATENT DOCUMENTS

| | | | |
|---|---|---|---|
| 2,424,942 | 7/1947 | Mynssen | 475/231 X |
| 4,799,402 | 1/1989 | Van Dest | 475/230 X |
| 4,802,383 | 2/1989 | Katayama et al. | 475/85 |
| 4,817,753 | 4/1989 | Hiketa | 475/85 X |
| 4,836,051 | 6/1989 | Guimbretie | 475/230 X |
| 4,860,614 | 8/1989 | Erdmann et al. | 475/246 |

Primary Examiner—Rodney H. Bonck
Assistant Examiner—Daniel Wittels
Attorney, Agent, or Firm—Harness, Dickey & Pierce

[57] ABSTRACT

A power delivering apparatus employs a viscous coupling for limiting differential action performed by a front differential of an engine-powered vehicle. In the power delivering apparatus, since at least one of rotary members of the viscous coupling is directly supported by a stationary support member of the body of the vehicle, it is possible to support the viscous coupling of the power delivering apparatus in a firmer manner than in the prior art, thereby permitting the power delivering apparatus to remarkably reduce both of vibration and noise.

3 Claims, 2 Drawing Sheets

POWER DELIVERING APPARATUS

BACKGROUND OF THE INVENTION

1. Field of the Invention

The present invention relates to a power delivering apparatus employed in an engine-powered vehicle in which toque developed in an engine of the vehicle is transmitted to wheel axles of the vehicle through the power delivering apparatus.

2. Description of the Prior Art

A power delivering apparatus for transmitting a torque developed in an engine of an engine-powered vehicle to opposite wheel axles of the vehicle is proposed in Japanese Patent Laid-Open No. 186051/1988 (in Japanese, called Tokkaisho 63-186051) which is an unexamined patent publication in Japan.

In the power delivering apparatus proposed in the above unexamined patent publication, the torque developed in the engine of the vehicle is changed in amount in a final reduction gear unit of the vehicle, and, thereafter the torque thus changed in amount is transmitted to the opposite wheel axles of the vehicle. This conventional power delivering apparatus comprises: a differential gear; and a differential-limiting unit such as a viscous coupling for limiting the differential action of the differential gear. As for the differential gear, such gear is necessary so that opposite wheels of the vehicle can rotate different amounts when the vehicle goes around a turn. As this happens, the outside one of the opposite wheels must turn more times that the inside one thereof. The differential gear permit this action while still delivering power to both of the opposite wheels to enable the vehicle to make turns easily. On the other hand, as for the differential-limiting unit such as the viscous coupling, in case that one of the opposite wheels of the vehicle loses traction on muddy or icy roads to cause the vehicle to stick in a muddy or icy spot, the differential-limiting unit prevents the differential gear from transmitting power exclusively to such substantially no-traction wheel, thereby permitting the vehicle to escape from these troublesome spots.

In the vehicle, this conventional differential gear is placed off a longitudinal center line of the vehicle in a width direction thereof, while connected with opposite wheel axles through opposite constant velocity universal joints. Each of the opposite wheel axles comprises: a first axle member extending between the differential gear and the constant velocity universal joint; and a second axle member extending between the constant velocity universal joint and a wheel. In the vehicle having the above construction, in order to make these second axle members equivalent in length to each other, it is necessary to make one of the first axle members longer than the other of the first axle members. Such longer one of the first axle members is splined to a hub of the differential-limiting unit or viscous coupling so that the two must turn together, while supported by a vehicle body through a bearing in the vicinity of the constant velocity universal joint connected with such longer one of the first axle members.

However, in the conventional vehicle having the above construction, since looseness is most likely to occur between the longer one of the first axle members and the bearing or the hub, and since the viscous coupling which is larger in diameter than each of the wheel axles increases such looseness, the viscous coupling is most likely to vibrate noisily when the wheel axles are rotatably driven. This is a problem inherent in the conventional power delivering apparatus.

SUMMARY OF THE INVENTION

Therefore, it is an object of the present invention to provide a power delivering apparatus which comprises both of a differential gear and a differential-limiting unit such as a viscous coupling for limiting the differential action of the differential gear, and is substantially free from vibration and noise.

The above object of the present invention is accomplished by providing:

In a power delivering apparatus provided in an engine-powered vehicle comprising:

a differential gear;

a viscous coupling for limiting the differential gear in its differential action, the viscous coupling being provided with a plurality of rotary members while separated from the differential gear in construction; and opposite wheel axles to which power developed in an engine of the engine-powered vehicle is transmitted through both of the differential gear and the viscous coupling;

the improvement wherein:

at least one of the rotary members of the viscous coupling is supported by a stationary member of a vehicle body of the engine-powered vehicle through a bearing.

In the power delivering apparatus of the present invention having the above construction, since at least one of the rotary members of the viscous coupling is directly supported by the stationary member of the vehicle body through the bearing, looseness between the wheel axles and the viscous coupling is reduced to permit the viscous coupling to minimize its vibration and noise in operation.

DESCRIPTION OF THE PREFERRED EMBODIMENTS

Figure 1:
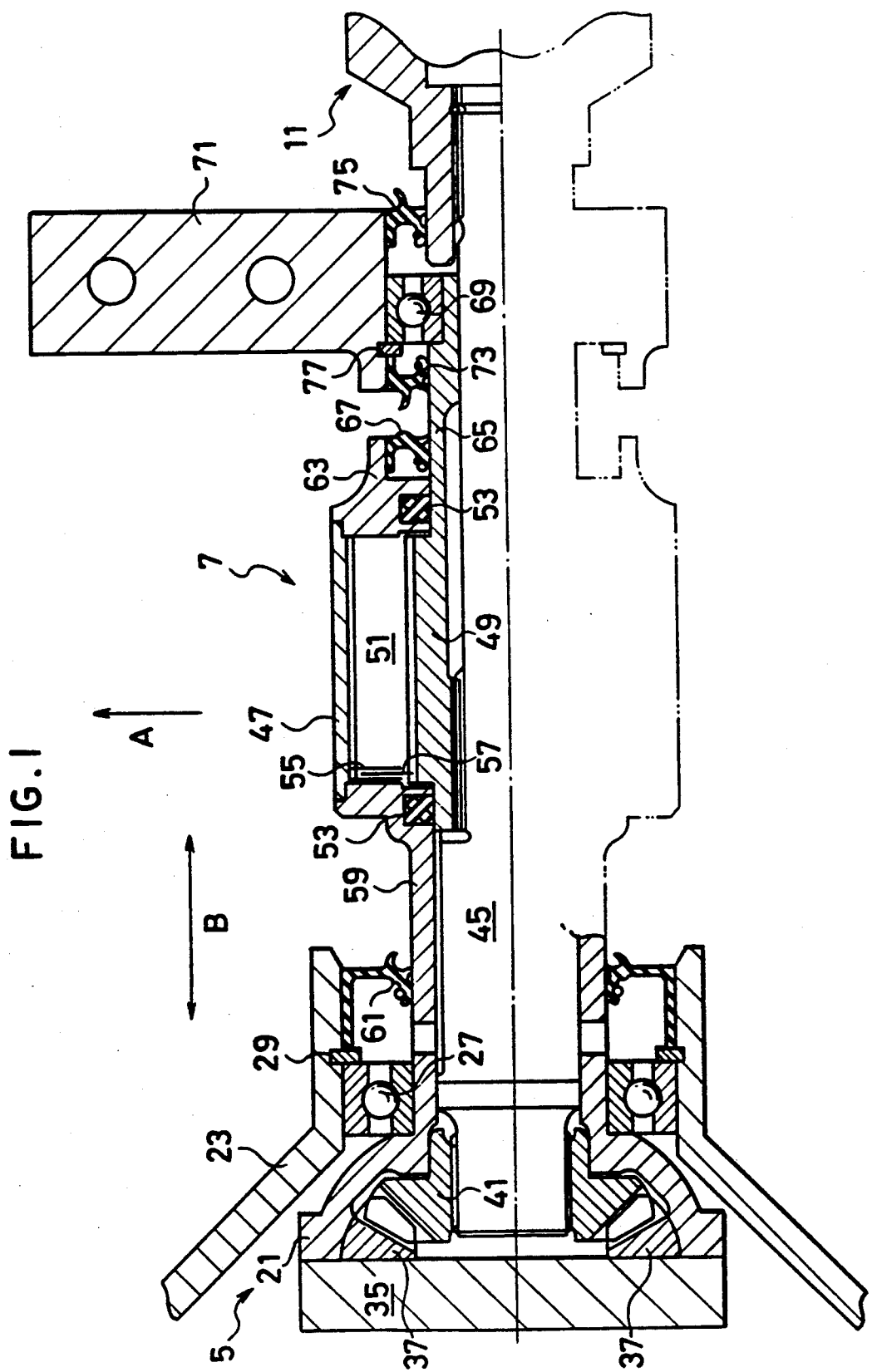
FIG. 1 is a longitudinal sectional view of the power delivering apparatus of the present invention, illustrating both of the front differential and a viscous coupling employed in the power delivering apparatus of the present invention.
Figure 2:
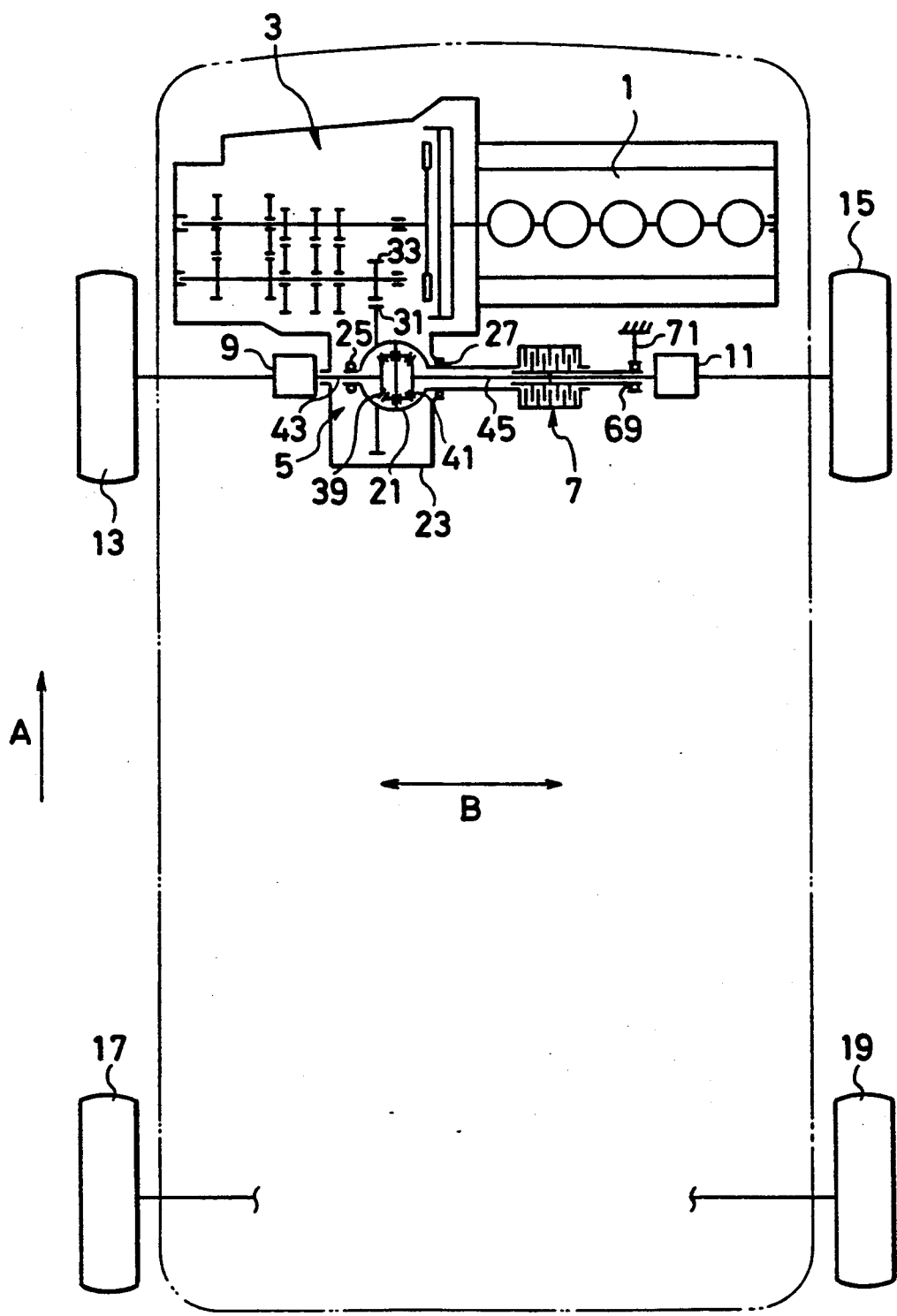
FIG. 2 is a plan view of the engine-powered vehicle employing the power delivering apparatus of the present invention shown in FIG. 1, illustrating the front differential and the opposite wheels of the vehicle.

Hereinbelow, an embodiment of the power delivering apparatus of the present invention will be described in detail with reference to the accompanying drawings (FIGS. 1 and 2).

FIG. 2 shows power-train components of a front-wheel drive vehicle in which the embodiment of the power delivering apparatus of the present invention is employed. Incidentally, in FIG. 2, a direction indicated by an arrow "A" indicates a forward or longitudinal direction of the vehicle. On the other hand, directions indicated by a double arrow "B" indicate a width direction of the vehicle.

First of all, the power-train components of the front-wheel drive vehicle shown in FIG. 2 will be described. As is clear from FIG. 2, the power-train components of the vehicle comprises: an engine 1; transmission 3; a front differential 5 which is interposed between opposite front wheels 13, 15 and forms a differential gear, i.e., one of constitutional elements of the embodiment of the power delivering apparatus of the present invention; a viscous coupling 7; constant velocity universal joints 9, 11; the opposite front wheels 13, 15; and opposite rear wheels 17, 19.

As shown in FIG. 1, a differential case 21 of the front differential 5 is supported by a transaxle case 23 through bearings 25, 27. As is clear from FIG. 1, a retaining ring 29 for positioning the bearing 27 is fixedly mounted on an inner peripheral surface of a right-end portion of the transaxle case 23. On the other hand, a ring gear 31 is fixedly mounted on the differential case 21 of the front differential 5, while meshed with an output gear 33 of the transmission 3. Consequently, the torque developed in the engine 1 is transmitted to the differential case 21 of the front differential 5 to rotatably dive the same 21.

As shown in FIG. 1, in the front differential 5: a pinion shaft 35, which is mounted in the differential case 21 of the front differential 5, rotatably supports a pair of pinion gears 37 thereon; and each of the pinion gears 37 is meshed with each of opposite side gears 39, 41 the left one 39 of which is splined to a left front wheel axle 43 so that the two must turn together. On the other hand, the right one 41 of the side gears 39, 41 is splined to the right front wheel axle 45 (output shaft) so that the two must turn together.

In operation, the torque transmitted to the differential case 21 of the front differential 5 is split into two parts through the pinion shaft 35 pinion gears 37 and the side gears 39, 41, which two parts are further transmitted to the front wheels 13, 15. When a difference in rotational speed or resistance between the front wheels 13 and 15 is produced during traveling of the vehicle, the pinion gears 37 begin to rotate on the pinion shaft 35 to control a ratio of the two parts of the torque being transmitted to the opposite front wheels 13, 15.

In the vehicle having the above construction, the front differential 5 is placed off a longitudinal center line of the vehicle so as to be disposed in a left half portion of the vehicle together with the transmission 3, as viewed in FIG. 2. As a result, as is clear from the plan view of the vehicle shown in FIG. 2, a right front wheel axle 45 is longer than a left front wheel axle 43. The viscous coupling 7 is disposed in a substantially intermediate portion of this right front wheel axle 45.

The viscous coupling 7 is provided with a housing 47 forming a first torque-transmitting member which is rotatably mounted on a hub 49 forming a second torque-transmitting member. An operating chamber 51 is defined between the housing 47 and the hub 49, while filled with a viscous fluid such as high viscosity silicone oils. The operating chamber 51 is liquid-tightly sealed with a pair of X rings 53 interposed between the housing 47 and the hub 49. The X rings 53 are sealing means each of which is constructed of a solid filament material assuming X-shaped cross section as shown in FIG. 1. In the operating chamber 51 of the viscous coupling 7 are disposed a plurality of outer or first plates 55 which are spaced alternately with a plurality of inner or second plates 57 in the interior of the operating chamber 51. The first plates 55 have their outer peripheral portions splined to an inner peripheral portion of the housing 47 so that the plates 55 and the housing 47 must turn together in operation. On the other hand, the second plates 57 have their inner peripheral portions splined to an outer peripheral portion of the hub 49 so that the plates 57 and the hub must turn together in operation.

As shown in FIG. 1, the housing 47 is provided with a boss portion 59 in its left-end portion, while connected with the differential case 21 of the front differential 5 through the boss portion 59 of the housing 47 so as to turn together with the differential case 21 of the front differential 5 in operation. The viscous coupling 7 has the above construction. A sealing means 61 is interposed between: a stationary case 23 of the front differential 5; and the boss portion 59 of the housing 47. Another sealing means 67 is interposed between: a right-end boss portion 63 of the housing 47; and a right-end boss portion 65 of the hub 49.

When the front differential 5 performs its differential action to produce a difference in rotational speed between the housing 47 and the hub 49, the viscous resistance (of the silicone oils filled in the operating chamber 51) to rotation of one of the housing 47 and the hub 49 relative to the other causes the plates 55 or 57 to rotate. At this time, an amount of torque causing the plates 55 or 57 to rotate increases as the difference in rotational speed between the housing 47 and the hub 49 increases. In other words, such amount of torque decreases as the difference in rotational speed between the housing 47 and the hub 49 decreases.

The right-end boss portion 65 of the hub 49 extends to an area of the immediate vicinity of the constant velocity universal joint 11 to have its extreme rightward end supported by a stationary support member 71 of the vehicle body through a bearing 69. Sealing means 73 and 75 are interposed between: the right-end boss portion 65 of the hub 49 and the stationary support member 71 of the vehicle body; and the constant velocity universal joint 11 and the stationary support member 71 of the vehicle body; respectively. As shown in FIG. 1, a retaining ring 77 is fixedly mounted on the stationary support member 71 of the vehicle body to position the bearing 69.

As described above, in contrast with the conventional power delivering apparatus in which the hub is supported by the wheel axle through the bearing, the hub 49 of the power delivering apparatus of the present invention is directly supported by the stationary support member 71 of the vehicle body through the bearing 69. Consequently, such stationary support member 71 of the vehicle body substantially reduces vibration of the front wheel axle 45 to permit the power delivering apparatus of the present invention to be substantially free from vibration and noise.

In operation, when one of the front wheels 13, 15 of the vehicle shown in FIG. 2 loses its traction on a rough road, the viscous coupling 7 of the power delivering apparatus of the present invention limits the differential action performed by the front differential 5 to enable the other one of the front wheels 13, 15 to be rotatably driven by the engine 1, thereby permitting the vehicle not to stick in poor-traction spots of the rough road, whereby the vehicle provided with the power delivering apparatus of the present invention is considerably improved in its traveling properties.

Incidentally, the front differential 5, which constitutes a bevel-gear type differential mechanism, may be substituted with any other suitable differential mechanism, for example such as a planetary-gear type differential mechanism, a worm-gear type differential mechanism and like differential mechanisms.

In addition, in the above embodiment of the power delivering apparatus of the present invention, although the differential case 21 of the front differential 5 is supported on the ball bearing 27 in the interior of the stationary case 23, it is also possible to support the differential case 21 of the front differential 5 through a thrust bearing in the interior of the stationary case 23 of the front differential 5.

In the power delivering apparatus of the present invention having the above construction, since at least one 49 of the rotary members 47, 49 of the viscous coupling 7 is directly supported by the stationary support member 71 of the vehicle body through the bearing 69, it is possible to support the viscous coupling 7 of the power delivering apparatus in a firmer manner than in the prior art, thereby permitting the power delivering apparatus of the present invention to remarkably reduce both of vibration and noise. This is a remarkable effect inherent in the power delivering apparatus of the present invention.

What is claimed is:

1. A transmission device comprising:
 a differential gear;
 a pair of wheel axles coupled with said differential gear, said wheel axles and differential gear driven by an engine;
 a viscous coupling coupled with said differential gear and first one of said axles, said viscous coupling including a plurality of rotary members which are coaxially positioned about said first axle, a first rotary member coupling said viscous coupling with said differential gear and said first rotary member being rotatably supported in a first bearing, a second of said rotary members which surrounds said axle, said second rotary member being rotatably supported in a second bearing, said second bearing supported by a stationary member of a vehicle.

2. The device according to claim 1 wherein said second rotary member is a hub shaft of the viscous coupling coaxially surrounding said axle shaft.

3. The device according to claim 1 wherein said first rotary member is a housing of said viscous coupling having a boss shaft coaxially surrounding said axle and coupling said viscous coupling with said differential gear.

* * * * *